United States Patent [19]

Caddell

[11] Patent Number: 4,750,272
[45] Date of Patent: Jun. 14, 1988

[54] TOOL MEASURING DEVICE EMPLOYING GAP WIDTH DETECTION

[75] Inventor: Richard W. Caddell, La Porte County, Ind.

[73] Assignee: Kearney & Trecker Corporation, West Allis, Wis.

[21] Appl. No.: 927,705

[22] Filed: Nov. 6, 1986

[51] Int. Cl.$^4$ ............................................... G01B 5/02
[52] U.S. Cl. ....................................... 33/639; 33/201; 33/558; 33/172 E; 33/504
[58] Field of Search .................. 33/201, 504, 626, 638, 33/639, 630, 642, 636, 172 E, 561, 558

[56] References Cited

U.S. PATENT DOCUMENTS

| | | |
|---|---|---|
| 3,491,624 | 1/1970 | Poineenot . |
| 3,492,467 | 1/1970 | Caban et al. . |
| 3,587,360 | 6/1971 | Oxenham . |
| 3,636,814 | 1/1972 | Esch . |
| 3,888,015 | 6/1975 | Williams ................................ 33/639 |
| 3,995,528 | 12/1976 | Rethwish . |
| 4,016,784 | 4/1977 | Brown . |
| 4,031,628 | 6/1977 | Kaesemeyer ........................ 33/201 |
| 4,204,782 | 5/1980 | Spits et al. . |
| 4,228,595 | 10/1980 | Steinbach ............................ 33/201 |
| 4,334,178 | 6/1982 | Lipp . |
| 4,440,053 | 4/1984 | Yamakage . |
| 4,513,616 | 4/1985 | McMurtry . |
| 4,592,146 | 6/1986 | Campbell ............................ 33/630 |

FOREIGN PATENT DOCUMENTS 68643 1/1983 European Pat. Off. ............. 33/201

Primary Examiner—William D. Martin, Jr.
Attorney, Agent, or Firm—James O. Skarsten

[57] ABSTRACT

A tool measuring apparatus for a machine tool is provided with a plunger (16) mounted to move along an axis (22) to vary the spacing between the end of the plunger and an inductive element (26) of an inductive displacement measuring device (24). Device (24) generates a signal $V_y$ which varies as a function of the spacing between the plunger (16) and device (24). Spindle (14), engaging a tool (12), is moved to a position M located a known distance from inductive element (26). As the spindle is moved to position M, tool (12) engages plunger 16 and moves the plunger to decrease the spacing between the plunger and the element (26) to a value $S_3$, corresponding to an unknown length d of tool (12). Levels of $V_y$ corresponding to spacing $S_3$ and to $S_2$, representing a known nominal value N of tool length, are coupled to a processor 32 and a control 30 to determine tool offset e, i.e., the difference between actual length d and nominal length N.

11 Claims, 4 Drawing Sheets

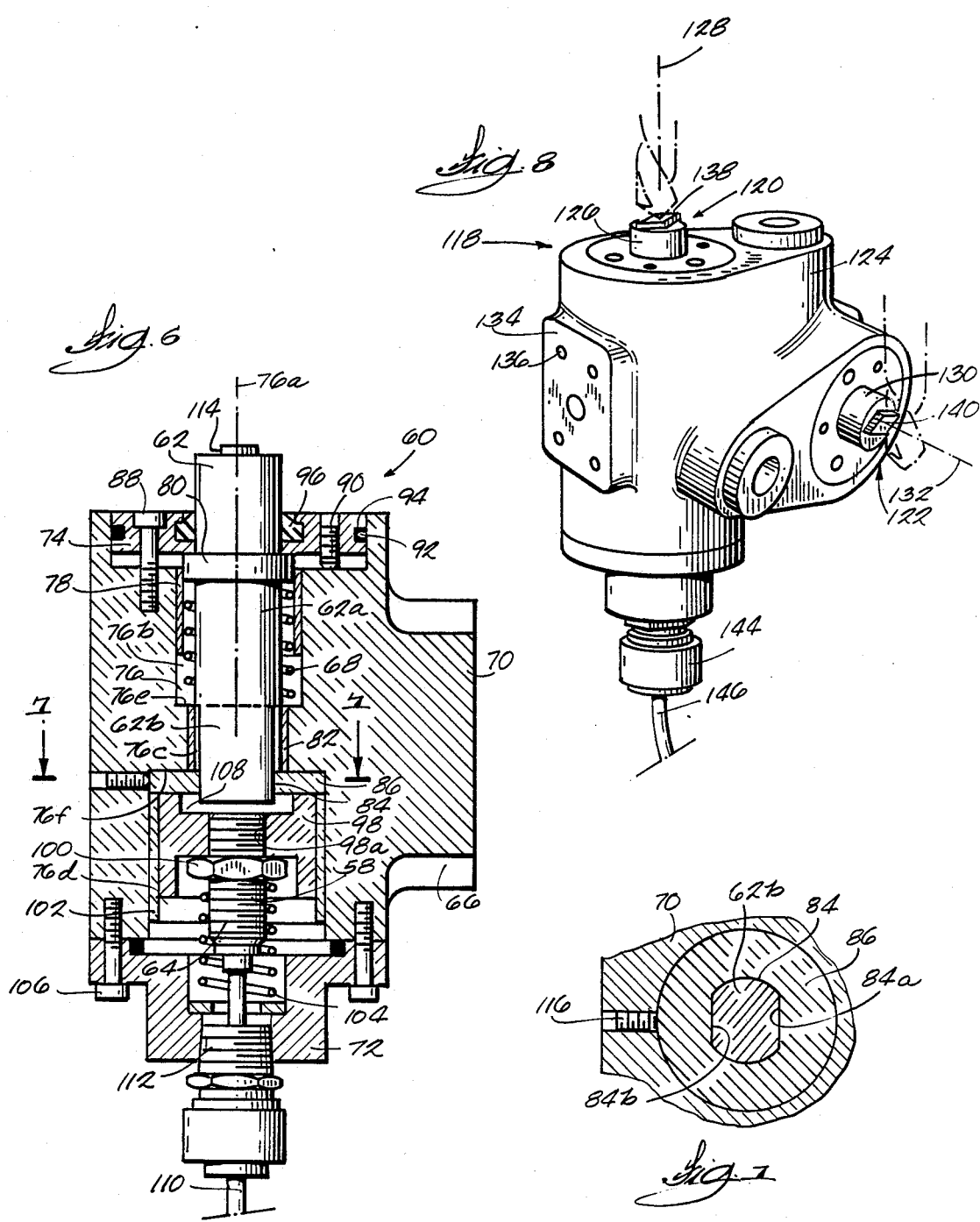

TOOL MEASURING DEVICE EMPLOYING GAP WIDTH DETECTION

BACKGROUND OF THE INVENTION

The invention pertains to a device for measuring selected dimensions of single-point and multi-point cutters or cutting tools intended for use with a machine tool.

When a computer numerical control is employed to operate a machining center or other machine tool, the control is generally provided with a number of part programs. Execution of a program results in the generation of a series of commands which direct the machine tool to move cutters or cutting tools engaged thereby over specified distances, relative to a part, to automatically machine the part.

In designing a part program, the various distances are typically selected on the assumption that the pertinent dimensions of associated tools, such as tool length or radius, have particular assigned values. However, the actual or true dimensional values of a tool engaged by the machine tool may be significantly different from the assigned, or nominal values. The difference between the nominal and actual values of a tool dimension is referred to as tool offset. It will be readily apparent that the offset values of a tool must be determined and coupled to the numerical control, to enable the control to compensate for the offsets when executing a part program.

U.S. Pat. No. 3,492,467, issued Jan. 27, 1970 for a "Tool Offset Control for Digital Numerically Controlled Point-to-Point Machine Tools" shows an arrangement for measuring the actual length of a tool engaged in a machine tool spindle. The spindle is initially positioned at a spindle zero reference position, and is then advanced toward a tool sensor. As the spindle and engaged tool are moved, a counter generates successive counts which are stored in a register. When the tool reaches the tool sensor, the contents of the register indicate the offset of the engaged tool.

U.S. Pat. No. 4,016,784, issued Apr. 12, 1977 for "Tool Setting Device", shows an arrangement employing a linear variable displacement transducer (LVDT). As taught by such patent, a core of magnetic material is mechanically linked to be moved by a tool, such that displacement of the core corresponds to tool offset. The core moves within a coil form, a primary coil being wound around the center of the form and secondary coils being wound on either side of the primary coil. The difference between the output voltages of the two secondary coils varies relative to the position of the core within the coil form, and may thus be used in determining offset.

U.S. Pat. No. 4,334,178, issued June 8, 1982 for "Method and Apparatus for Correcting Tool Lengths and Tool Radii, Particularly for Numerically Controlled Machines Equipped with Position or Path Measuring System by Means of Nominal-Actual Value Comparison", shows an arrangement in which a tool engaged by a machine tool spindle is moved against a pin to measure tool length or radius. The speed of the tool and pin is decreased to a reference speed, whereupon a moveable member of an inductive transmitter is engaged and moved to a zero position.

Prior art devices of the above type for measuring tool offset may require excessive moving parts, or be characterized by other complexities tending to increase cost and reduce precision of measurement. Also, some of such devices may not be readily adapted to rapid measurement of tool dimensions, such as may be highly desirable when it is necessary to measure the radius of every single tooth of a multi-point tool having in excess of 60 teeth.

SUMMARY OF THE INVENTION

A device for measuring a selected parameter or dimension of a cutter or cutting tool includes a frame; a plunger or other member supported by the frame for contact with the cutting tool and for movement in response to the tool contact to change the spacing between the plunger and a reference position to an amount representing the value of the selected tool parameter; a device located at the reference position to generate a signal representing the spacing between the plunger and reference position; and means for processing the signal to determine a specific value of the signal representing the selected parameter. Usefully, the tool is engaged by a machine tool spindle and moved to contact the plunger or other member by maneuvering the spindle under command of a numerical control.

An advantage of the invention lies in simplifying devices of the type used to measure a tool used in a machine tool, such as a cutter or cutting tool held in a machine tool spindle, while retaining or improving measurement accuracy.

Another advantage lies in providing a device which is capable of measuring tool off-set or error, i.e., the difference between actual and nominal values of a tool dimension while the tool is located at a stationary position, rather than while the tool is in motion.

Another advantage lies in providing a *single* device for measuring various dimensions or parameters of both single-point and multi-point tools, such as tool length, tool radius, offset, and run-out in multi-point tools (i.e., the difference between the radii of the longest and shortest teeth of such tool.)

Another advantage lies in providing a device for measuring tools which differ widely in size and weight.

Another advantage lies in providing a device for measuring tools which can be oriented along either of two mutually orthogonal axes.

Another advantage lies in providing a tool measurement device which is capable of measuring tools rapidly.

Another advantage lies in providing a device for measuring tools having a mechanism for protecting the device against substantial over-travel of a tool which is being moved toward the device.

These and other advantages will become more readily apparent from the ensuing Detailed Description of the Preferred Embodiment, taken together with the drawings.

BRIEF DESCRIPTION OF THE DRAWINGS

FIG. 6 is a sectional view showing a modification of the embodiment of FIG. 1.

FIG. 7 is a sectional view taken along lines 7—7 of FIG. 6.

FIG. 8 shows a device incorporating two of the devices shown by the modification of FIG. 6 for measuring a cutting tool along two orthogonal axes.

DETAILED DESCRIPTION OF THE PREFERRED EMBODIMENT

Figure 1:
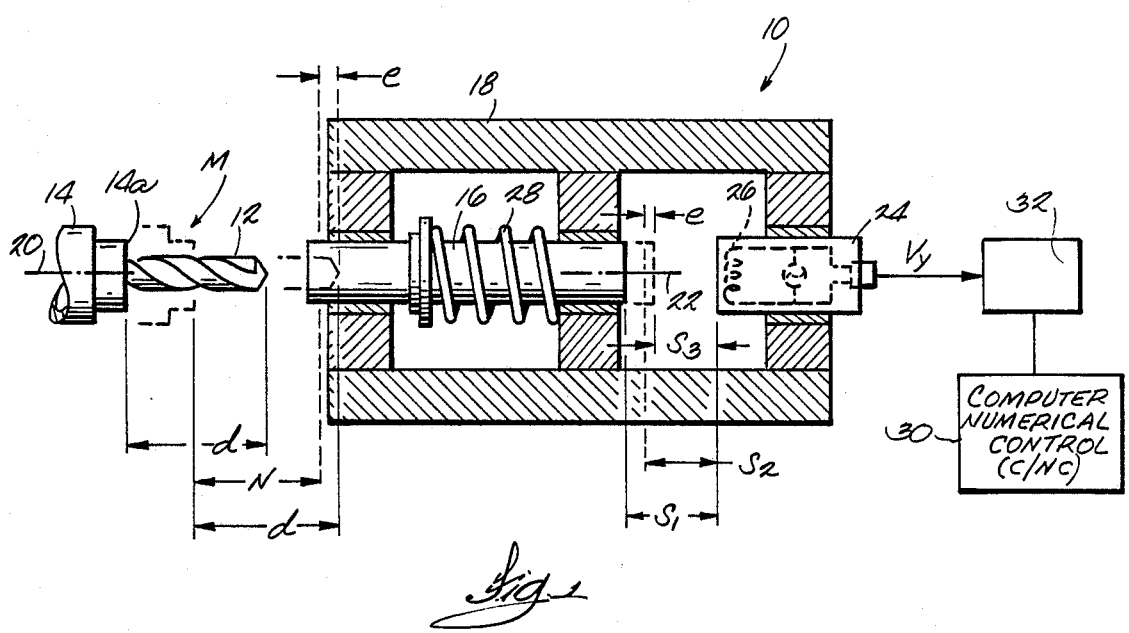
FIG. 1 is a sectional view showing a simplified embodiment of the invention.

FIG. 1 shows a device 10 in simplified form for measuring the actual length d of a tool 12, such as a tool held in a spindle 14 of a machining center (not shown) which is automatically operated by a numerical or computer numerical control 30 to perform a machining operation on a part or workpiece (not shown). As is well known, control 30 generates commands which are coupled to actuate the axis drive (not shown) in the machining center to selectively position the spindle 14 and tool 12 relative to a workpiece. Other commands are coupled from control 30 to the spindle drive motor (not shown) to rotate the spindle and tool. As stated above, the error or offset e between the actual length d of the tool 12, and a nominal length N therefor, which is specified in a part program, must be precisely known. Thus the offset e in tool length can be compensated for by the numerical control, as it executes the part program to use the tool 12 in performing a machining operation. FIG. 1 shown the actual tool length d and nominal tool length N measured from the spindle nose 14a of spindle 14.

Device 10, in simplified form, comprises a plunger 16 formed of conductive material; a frame 18 supporting the plunger 16 for movement along an axis 22; a sensor device 24 supported by frame 18 and having a sensor element 26 located along the axis 22 in spaced apart relationship with the plunger 16, sensor 24 generating a voltage signal $V_y$ which varies as a function of the spacings between the plunger and sensor element 26; and means such as a spring 28 for biasing the plunger with respect to the frame such that the spacing between the plunger 16 and sensor element 26 will be a value $S_1$ in the absence of external forces applied to the plunger.

To employ device 10 to measure tool length offset, control 30 generates commands to move spindle 14 to position tool 12 to the left of plunger 16, as viewed in FIG. 1, and to align the axis 20 of the spindle 14 and tool 12 with the plunger movement axis 22. The spindle and tool are then moved rightwardly to a position M. M is selected with respect to nominal length N so that as the tool and spindle are moved rightwardly to position M, tool 12 will engage plunger 16 and move it toward sensor element 26. Thus, the spacing between the plunger 16 and sensor element 26 will be diminished to a value $S_2$, if tool offset e is zero, so that d=N. However, for a non-zero value of tool offset, the spacing will have a value $S_3$, where $e=S_2-S_3$. Thus offset e can be determined from the voltage levels $V_y$ occurring when the spacing S is at values $S_2$ and $S_3$, respectively, and from a knowledge of the functional relationship between $V_y$ and spacing S. Preferably, such relationship is linear. $V_y(S_2)$ can be determined, for example, by noting the voltage $V_y$ when spindle 14 is moved to position M and a tool known to be precisely of lenth N is carried in the spindle. A signal processor 32, as hereinafter described, receives voltage signals $V_y$ to recognize the particular voltage level $V_y$ corresponding to the spacing $S_3$.

It will be appreciated that device 10 can be readily employed to measure actual tool length and as well as offset e, since $d=N+e$ where N is a known value.

In order to employ devie 10 to make a very rapid measurement of tool length offset, spindle 14 may be rapidly moved to position M, and then be immediately withdrawn therefrom. Thus, the spacing between plunger 16 and device 24 will first decrease to $S_3$, and then increase. Usefully, $V_y$ will increase or decrease as the spacing between plunger 16 and sensor 24 respectively increases or decreases. Then, offset e will be represented by the minimum value of $V_y$ occurring during the course of spindle movement. Thus, to enhance the use of device 10 in measuring tools rapidly, processor 32 usefully comprises a device, as hereinafter described, which is configured to recognize or "capture" such minimum value of $V_y$.

Figure 2:
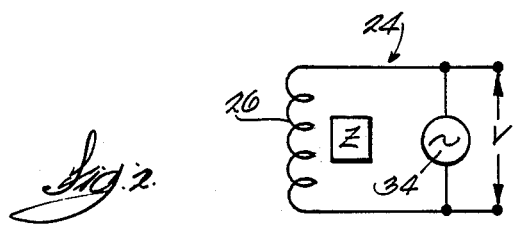
FIG. 2 is a simplified schematic diagram for illustrating a displacement measuring system for the embodiment of FIG. 1.

FIG. 2 shows sensing device 24 usefully comprising an inductive displacement measuring device, and further shows the sensing element 26 comprising an inductive coil in such device, coupled in parallel with an oscillator 34. If the oscillator 34 comprises a device for exciting coil 26 with a current of constant amplitude I coil voltage V will linearly vary with coil impedance Z. Coil 26, when excited, will project an electro-magnetic field into a spaced-apart body of conductive material, such as the plunger 16, causing eddy currents to be generated therein. The eddy currents produce a secondary field, which is reflected back to coil 22 to vary the impedance Z thereof. Variation of impedance Z is a function of the distance or spacing between the coil 26 and the conductive material. Thus, coil voltage V also varies as a function of the separating distance. If the spacing between the coil 26 and plunger 16 is within certain limits, the output voltage provided by the measuring device will vary linearly with such spacing. A very useful type of such device is that manufactured by the Electro Corporation and referred to thereby as an "ELECTRO-MIKE" displacement transducer.

Figure 3A:
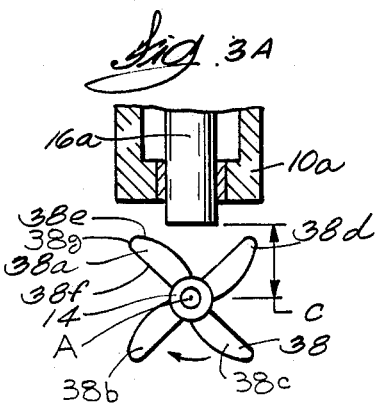
FIGS. 3A–3D respectively show an embodiment of the invention employed in measuring radius of a tooth of a multi-point cutting tool.

FIG. 3A shows spindle 14 engaging a multi-point tool 38, having teeth 38a–38d, and positioning the tool 38 proximate to a measuring device 10a. Device 10a is identical to device 10 and has a plunger 16a identical to plunger 16. However, the plunger 16a is supported to move along an axis which is in orthogonal relationship with the axis of spindle 14, rather than in parallel or aligned relationship. Device 10a operates in like manner as device 10 to generate a voltage signal $V_x$ which varies with displacement of plunger 16a from a fully biased position by action of a contacting tool, and thus represents a parameter of such tool.

By positioning device 10a so that the axis of movement of plunger 16a is orthogonal to the common axis of spindle 14 and a tool 38, such device can be employed to determine the offset or error in the radius of each tooth 38a–38d of tool 38 from a specified nominal radius. FIG. 3A shows the radius of a tooth to be the distance between the tip 38g of the tooth and the axis A of the tool 38. In measuring radius offset, the spindle and tool are moved to position their common axis a distance C from the end of the plunger 16a when the plunger 16a is in its fully biased position. The tool 38 is then rotated in a direction opposite to the direction of rotation for performing machining operations. Thus, as shown by FIG. 3A, the curved or non-cutting side 38e of tooth 38a leads the flat or cutting side 38f thereof in approaching plunger 16a.

FIG. 3A further shows plunger 16a positioned between adjacent teeth 38a and 38d of tool 38, so that the plunger is in its fully biased position. Usefully, signal $V_x$ has a value of 7.5 volts when plunger 16a is fully biased.

Figure 3B:
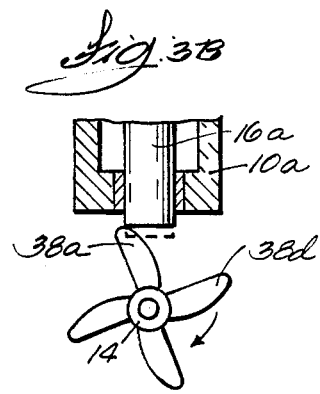

FIG. 3B shows the curved side 38e of tooth 38a contacting plunger 16a. As tool 38 continues to rotate, plunger 16a is progressively displaced into device 10a, and voltage $V_x$ decreases from its fully biased value of 7.5 volts.

Figure 3C:
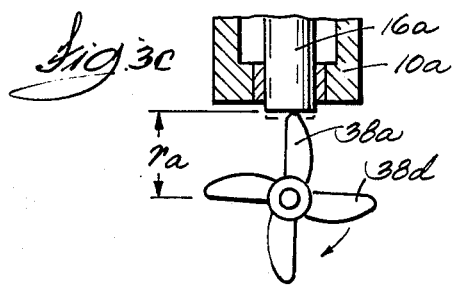

FIG. 3C shows plunger 16a contacted by the tip 38g of tooth 38a, and therefore at its maximum extent of displacement for such tooth. The value of signal $V_x$ corresponding to such maximum displacement thus represents both the radius $r_a$ of tool 38a and the offset between radius $r_a$ and the nominal radius.

Figure 3D:
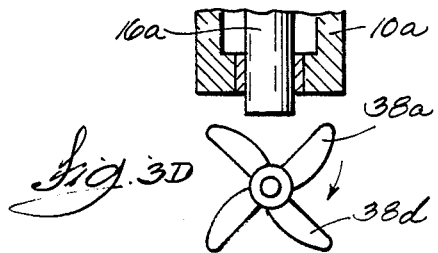

FIG. 3D shows plunger 16a returned to its fully biased position, after tooth 38a has moved out of contact therewith and before tool 38b has come into contact therewith. It is anticipated that the biasing spring (not shown) of device 10a will immediately return plunger 16a to its fully biased position as soon as the tip of a tool tooth moves out of contact with the plunger.

Device 10a may be employed to rapidly measure radius offset of all of the teeth 38a–38d by positioning tool 38 as shown in FIGS. 3A–3D, and then rotating the tool through one complete revolution. The signal $V_x$ generated during the revolution will have four minimum levels, each representing one of the radii $r_a$–$r_d$ and their respective offsets. $V_x$ is coupled to processing device 32, configured as hereinafter described, to recognize the minimum levels. The run-out of tool 38, i.e., the difference between the maximum and minimum radii of teeth 38a–38d, can be readily determined from the radius offsets.

When device 10a is employed to measure the tooth radius offsets in a multi-point tool, it will generally be desirable to rotate the tool rapidly, in order to minimize the required measurement time. However, as device 10a is used to measure tools having increasing numbers of teeth, the time intervals between minimum voltage levels representing tooth radii in a signal $V_x$ will become less and less, unless the speed of tool rotation is correspondingly reduced. However, as the time intervals decrease, it becomes increasingly difficult for processing circuitry receiving the signal $V_x$ to distinguish between the minimum voltage levels representing tooth radii and levels resulting from vibration or other effects.

Figure 4:
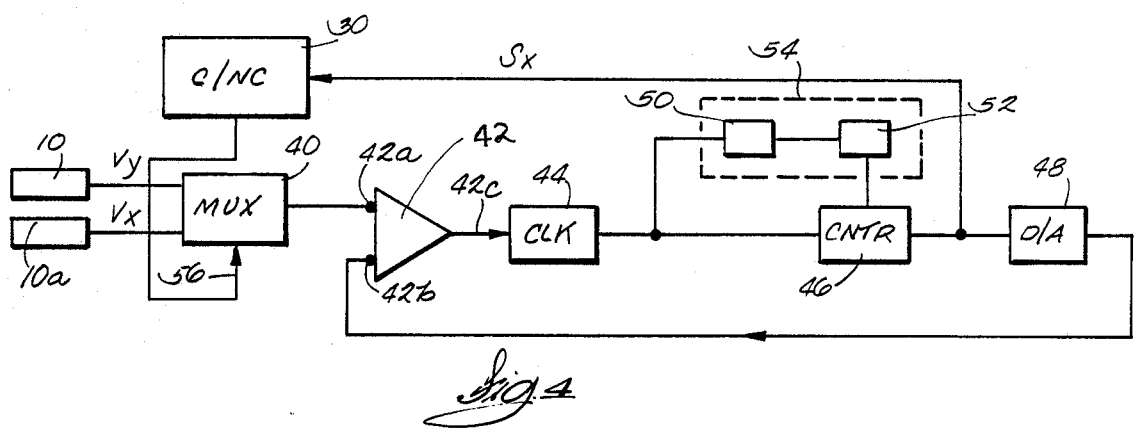
FIG. 4 is a block diagram showing an electronic signal processing device for the embodiment of FIG. 3.

FIG. 4 shows a signal processor 32 configured to recognize and hold minimum voltage levels, representing tooth radius offsets, in a signal $V_x$ generated by device 10a when a cutting tool such as tool 38 is rotated against plunger 16a. Such processor comprises a multiplexer 40; a comparator 42; a clock 44; a counter 46; a digital to analog (D/A) converter 48; and one-shots 50 and 52. All of such devices are well known in the art, and are readily available in a variety of forms. One-shots 50 and 52 are coupled together to form a level holding circuit 54, one-shot 50 being retriggerable and one-shot 52 being non-retriggerable.

Multiplexer 40 receives signal $V_y$ from sensor 24 of device 10 and signal $V_x$ from a sensor device (not shown) in device 10a, which is identical to device 24. The multiplexer 40 is operated by a signal received from numerical control 30 through a select line 56 to apply either the signal $V_y$ or $V_x$ to an input 42a of comparator 42, according to whether device 10 or 10a is being employed to measure a tool engaged by spindle 14. A second input 42b of comparator 42 comprises the output of D/A converter 48. Thus, the output 42c of comparator 42 is an analog signal comprising the difference between the output of D/A converter 48 and the selected sensor output.

FIG. 4 further shows the comparator output 42c coupled to clock 44, the clock being triggered to generate successive clock pulses when the comparator output is a non-zero value, of either positive or negative polarity. However, clock operation is halted when comparator output is zero. Generated clock pulses are coupled to counter 46, and also to the input of one-shot 50. Counter 46 is stepped down by one count by each clock pulse received from clock 44. Retriggerable one-shot 50 is triggered by each successive clock pulse and thus outputs a digital 1, or high level, until the clock has been stopped for the time period of the one-shot 50, usefully 25 milliseconds. At the end of such period, the output of one-shot 50 goes to a digital 0, or low level, and triggers one-shot 52, having a time period of only 3 microseconds. At the end of the brief 3 microsecond period, one-shot 52 changes states, i.e., goes from a high to a low level. Such change is coupled to counter 46 to reset the counter to its maximum count level. It will be seen that the output of counter 46, comprising a digital number $S_x$, is coupled to the numerical control 30 as well as to the input of D/A converter 48.

Figure 5:
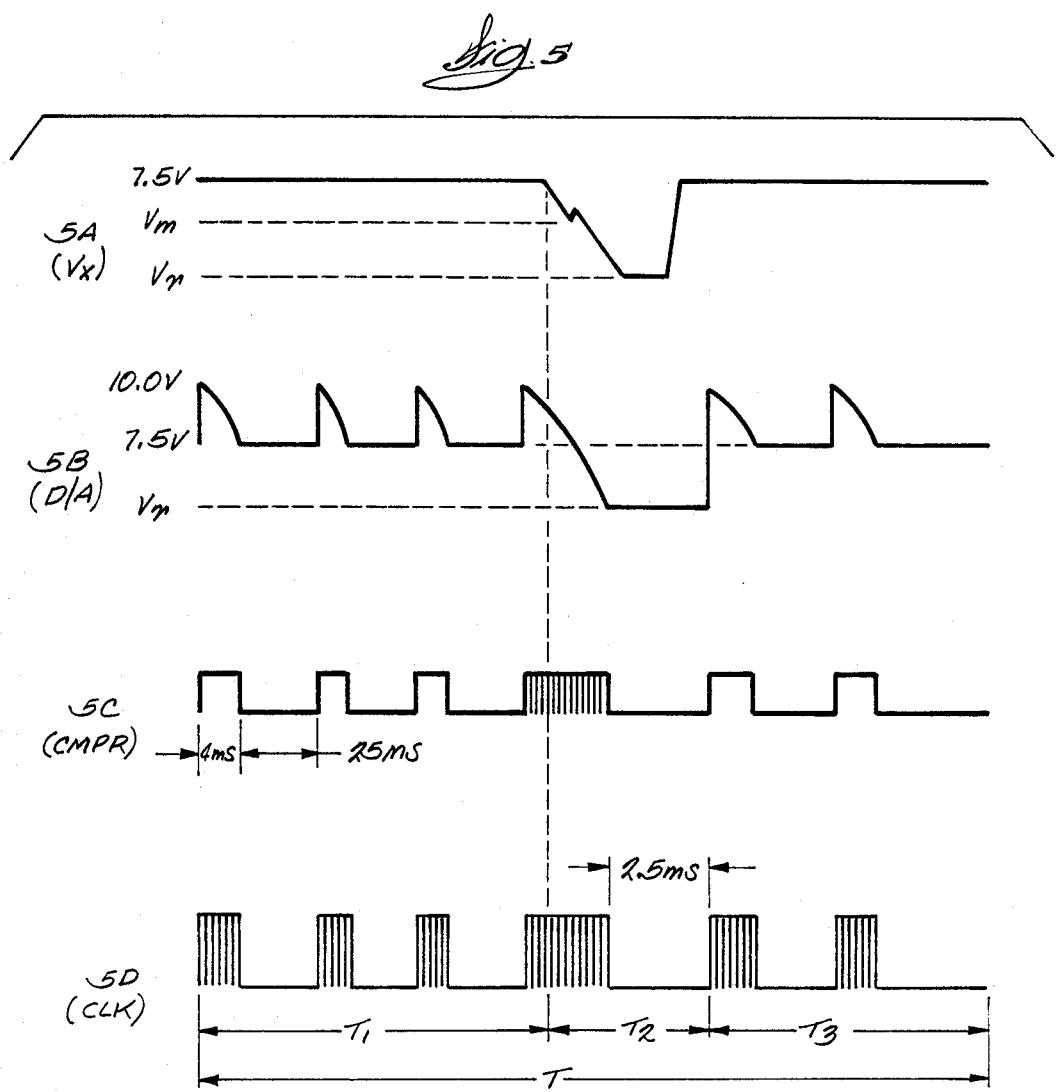
FIG. 5 shows a series of wave forms representing signals generated by the device of FIG. 4 in measuring tooth radius in a multi-point tool.

FIG. 5 shows a series of wave forms 5A–5D respectively indicating the outputs of measuring device 10a, D/A converter 48, comparator 42 and clock 44 during a time interval T. During such time interval, device 10a is employed to determine the radius offset of tooth 38a of tool 38, as previously described. Interval T comprises consecutive periods $T_1$, $T_2$ and $T_3$.

Period T commences when plunger 16a of device 10a is between teeth 38a and 38d of tool 38, as tool 38 is rotated by spindle 14. Thus, plunger 16a is in its fully biased position so that the output $V_x$ of sensor 24 is 7.5 volts. $T_1$ is also taken to commence at the time that counter 46 is reloaded by the one-shot 52, as previously described, so that the output of A/D convertor 48 is an analog voltage equivalent to the maximum digital count of counter 46. Usefully, such count is selected to provide a converter output of 10 volts, so that the output 42c of comparator 42 becomes non-zero at the commencement of period $T_1$. Clock 44 is thereby triggered to generate successive pulses, causing counter 46 to count down from its initial maximum value until the output of converter 48 becomes 7.5 volts, equal to the output of device 10a. Thereupon, the output of comparator 42 becomes zero and clock operation is halted. The time required for the output of converter 48 to go from 10 volts to 7.5 volts during period $T_1$ is determined by the frequency of clock 44, and is usefully on the order of 4 milliseconds. After the clock stops, level holding circuit 54 commences timing a period of 25 milliseconds (plus 3 microseconds), as previously stated, and resets counter 46 at the end of such period, causing the output of converter 48 to return to a value of 10 volts.

Period $T_2$ commences when tooth 38a of tool 38 contacts plunger 16a of device 24, so that plunger 16a is moved to decrease the spacing between the plunger and the sensor of device 10a. Thus, the signal $V_x$ decreases from 7.5 volts to a voltage level $V_r$, which occurs when the plunger 16a is contacted by the tip of tooth 38a, as shown in FIG. 3C. Thus, $V_r$ represents the radius of tooth 38a, and is on the order of 4.5-7.0 volts, depending on the size of the tool being measured. When the tip of tooth 38a moves out of contact with plunger 16a, the plunger is rapidly moved back to its fully biased position, and the output $V_x$ of device 24 returns to the corresponding level of 7.5 volts.

During the time that the output $V_x$ is going from 7.5 volts to $V_r$ the output of converter 48 will not be equal thereto, except possibly for very brief intervals on the order of 20–200 microseconds. Thus, clock 44 will continue to generate clock pulses during such time, so that counter 46 will continue to count down and the output of converter 48 will continue to decrease. However, when the counter reaches $V_r$ (in digital form), the output of D/A converter 48 becomes equal to the output of device 10. The output of comparator 42 thus goes to zero and clock 44 is halted. The digital form of voltage level $V_r$ comprises the signal $S_x$, coupled to the numerical control from the counter 46 to indicate the radius of tooth 38a. From $S_x$, together with a predetermined voltage level occurring for a known or nominal value of tooth radius, radius offset can be determined by the control.

The output of counter 46 is held at $S_x$ for 25 milliseconds, the period of level holding circuit 54. At the end of such period, counter 46 is reset, so that counter 46 is reloaded with its maximum count level and is enabled to again register counts. By providing level holding circuit 54, voltage minimums such as $V_m$ occurring in signal $V_x$, as shown in waveform 5A and which may result from vibration or like effects, will not be mistaken for the voltage level $V_r$.

Time period $T_3$ commences when counter 46 is reset. The respective outputs shown in waveforms 5A–5D during period $T_3$ are the same as during period $T_1$. Period $T_3$ ends before another tooth contacts the plunger 16a of device 10a.

While FIG. 5 shows certain specific time periods associated with the operation of various components of processor 32, it is to be understood that timing requirements are dependent upon a number of factors such as tool size, speed of tool rotation, the number of teeth or points on a tool, and speed of operation of the associated numerical control. Therefore, it may be necessary to provide a processor 32 with timing parameters different from those shown. It is anticipated that by judicious selection of timing parameters, a processor 32 could be configured to sense the respective radii of a cutting tool having on the order of sixty teeth, flutes or other cutting elements, as the tool was rotated relative to device 10a.

It is anticipated further that a processor 32 could be readily configured to recognize a minimum value of a signal $V_y$, representing tool length of a tool 12 which was rapidly moved against device 10, as previously described.

FIG. 6 shows a modified tool measuring device 60 having a plunger 62; a sensor 64; a frame 66; and a biasing spring 68. Such elements interact in the same manner as the corresponding elements of devices 10 and 10a to provide values of selected parameters of tools such as tools 12 and 38. Sensor 64 may be a device similar or identical to sensor 24, threads 58 being formed around sensor 64 for use in attaching sensor 64 to the frame as hereinafter described. Frame 66 includes a housing 70, an end cap 72 and a wiper support plate 74. Housing 70 is provided with a bore 76 oriented on an axis 76a and having bore sections 76b, 76c and 76d. The diameter of bore section 76c is less than the axes of bore sections 76b and 76d to respectively form shoulders 76e and 76f.

Plunger 62 is supported for movement in bore 76 along the axis thereof by means of a bearing 78. Bearing 78 is fitted within bore section 76b to slidably support a sleeve 80 fitted around a forward section 62a of plunger 62, section 62a usefully being of circular cross section. To further support plunger 62 for movement along the bore axis, a bearing 82, sized to the diameter of plunger section 62a, is fitted within bore section 76c. When plunger 62 moves along bore axis 76a, a rearward plunger section 62b moves toward or away from sensor 64 through a slot 84 formed through a spacer 86 abutting shoulder 76f. The spring 68 is positioned between shoulder 62e and the sleeve 80 fitted around plunger 62 to maintain a spacing of $S''$ between the plunger and sensor 64 when the plunger is in a fully biased position.

FIG. 6 shows the travel or movement of sleeve 80 limited by the position of wiper support plate 74. However, plate 74 is joined to housing 70 by means of bolts 88 which can be selectively rotated to vary the spacing between wiper support plate 74 and housing 70. Thus, bolts 88 can be used to selectively adjust the value of the spacing $S''$. A set screw 90 is provided to lock the plate 74 relative to housing 70 after a particular adjustment of $S''$ has been made. An O-ring 92 is received into a channel 94 formed around the circumference of the wiper support plate 74 to seal the joint between the plate 74 and housing 70 against coolant or other contaminants. A wiper 96, supported by plate 74, is fitted around plunger 62 to likewise prevent coolant or other contaminants from entering the housing.

FIG. 6 shows sensor 64 supported within bore section 76c by means of a sensor mounting block 98, the block 98 having a bore 98a sized to receive sensor 64. Bore 98a is provided with threads mating with threads 58 of sensor 64, the sensor 64 being rigidly secured to mounting block 98 by means of a lock nut 100. A bearing 102 fitted around bore section 76d enables mounting block 98 to slidably move along the bore axis 76a. However, a biasing spring 104 is positioned between lock nut 100 and end cap 72, joined to housing 70 by means of bolts 106, to urge mounting block 98 against spacer 86.

In the normal course of operation of device 60, biasing spring 106 retains mounting block 98 in position against spacer 86. A bore 108 is formed in block 98 to provide the spacing which is required between plunger 62 and sensor 64 for operation of device 60. However, when a spindle moves a tool against the plunger 62 in the course of tool measurement, the tool may inadvertently overtravel. The tool could then cause the plunger 62 to impact against the sensor 64 with comparatively great force. By providing mounting block 98 and biasing spring 104, sensor 64 is able to move backward against the spring in response to such force, avoiding serious damage to the sensor.

FIG. 6 further shows a cable 110 coupled to sensor 64 to carry signals representing the spacing between plunger 62 and sensor 64 to an electronic processor such as processor 32, previously described. The cable 110 passes through a bore formed through end cap 72, and is supported by means of a threaded plug 112 inserted into such bore.

FIG. 6 further shows a target, or tool contact member 114 mounted to the end of plunger 62 to make physical contact with tools to be measured by device 60. Target 114 and advantages thereof are hereinafter described.

FIG. 7 shows slot 84 through spacer 86 provided with flat opposing sides 84a and 84b. Plunger section 62b has a cross section complementary to slot 84, and the fit between plunger section 62b and slot 84 is sufficiently loose to allow plunger 62 to move along bore axis 76a. At the same time, the flat-sided configuration of slot 84 will prevent plunger section 62b and therefore plunger 62, from rotating relative to spacer 86. Spacer 86 may be angularly positioned relative to body 70 after loosening a set screw 116. A selected position of the spacer, plunger and target will then be maintained by tightening the set screw 116.

FIG. 8 shows a multiple axis measurement device 118 which includes measurement devices 120 and 122, both of which are identical to device 60, previously described, except that devices 120 and 122 have a common housing 124. Housing 124 supports plunger 126 of device 120 for movement along an axis 128, and supports plunger 130 of device 122 for movement along an axis 132 which is orthogonal to axis 128. Mounting plate 134, having screw holes 136, is shown to be integral with housing 124. Mounting plate 134 can be employed to secure device 118 to a machine tool such as a machining center, so that the X-axis of the machining center will be in parallel relationship with axis 132, and so that the Y-axis of the machining center will be in parallel relationship with axis 128.

FIG. 8 further shows targets 138 and 140 respectively attached to the ends of plungers 126 and 130. Measurement devices 120 and 122 are both provided with threaded plugs 144, identical to plug 112 of device 60, and with cables 146 supported thereby for respectively coupling signals $V_Y$ and $V_X$ to a processor 32.

Figure 9:
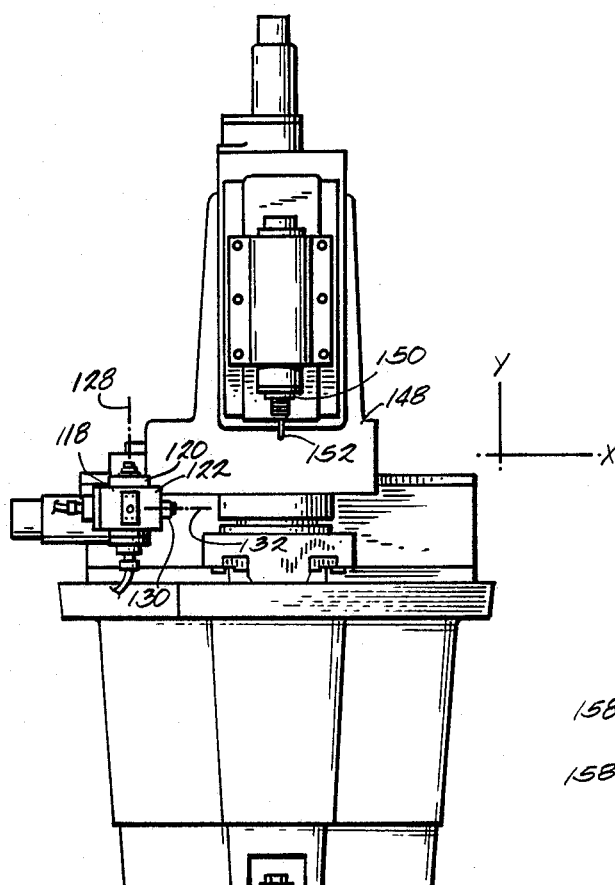
FIG. 9 is a view showing the device of FIG. 8 mounted to measure dimensions of tools used by a machining center.

FIG. 9 shows multiple axis measuring device 118 secured to a machining center 148 having a spindle 150. Device 118 is mounted to the machining center 148 so that the axis 128 of device 120 is in parallel relationship with the Y-axis of the machining center 148, and so that the axis 132 of device 122 is in parallel relationship with the X-axis of the machining center. Accordingly, spindle 150 can be readily moved to align the axis of a tool 152 inserted thereinto with axis 128, for example, to employ device 120 to measure the length of the tool 152. Alternatively, spindle 150 can be moved to position the side of tool 152 adjacent to the end of plunger 130 of measuring device 122, to measure the radius of tool 152, or to measure the respective radii of teeth or flutes of tool 152, according to the nature of such tool.

It is to be emphasized that measurement device 118 could be readily employed to measure dimensions of tools of a wide variety of sizes and types, whether inserted into a horizontal spindle or vertical spindle machining center or other machine tool.

Figure 10:
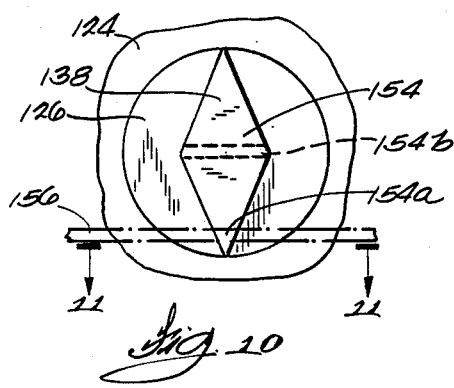
FIG. 10 shows a cutting tool at a first position with respect to a target mounted to an end of the plunger shown in FIG. 6.

FIG. 10 shows target 138 joined to plunger 126 having a diamond-shaped tool contact surface 154. While surface 154 may be an integral planer surface, it can be considered to comprise a number of surface elements of variable dimension such as elements 154a and 154b. Surface element 154a is much smaller in size than element 154b. In FIG. 10, a multi-point tool 156 is shown positioned relative to tool contact surface 154 so that rotation of tool 156 will cause respective teeth 156a thereof to successively engage surface element 154a. Target 138 and plunger 126 are thereby displaced by amounts respectively corresponding to the radii of teeth 156a, to determine the radii as previously described.

Figure 11:
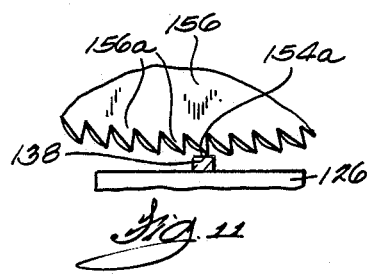
FIG. 11 is a sectional view taken along the lines 11—11 of FIG. 10.

FIG. 11 illustrates that surface element 154a of contact surface 154 is quite small in comparison to the spacing between the teeth 156a of tool 156. Consequently, only one tooth of tool 156 can be in contact with surface element 154a at any given time, so that the target 138 and plunger 126 can only be displaced by a single tooth at a time. Thus, a single $V_x$ generated by the device 120 associated with plunger 126 will represent the respective radii of individual teeth 156a. Also, surface element 154a is small enough, relative to the spacing between the teeth, to allow target 138 and plunger 126 to return to their fully biased position each time a tooth has moved out of contact with the target surface element 154a, and before the next-following tooth comes into contact with such surface element.

Figure 12:
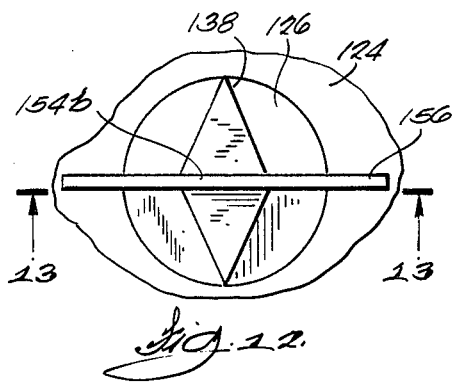
FIG. 12 is a view showing a cutting tool located at a second position with respect to the target of FIG. 6.

FIG. 12 shows tool 156 positioned to contact surface element 154b, rather than surface element 154a, as tool 156 is rotated.

Figure 13:
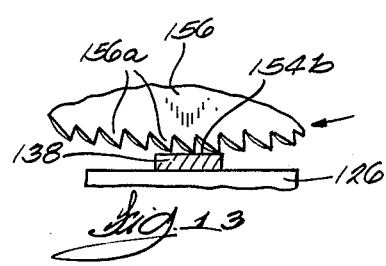
FIG. 13 is a sectional view taken along lines 13—13 of 12.

FIG. 13 shows a plurality of teeth 156b contacting surface element 154b at a given time, rather than just one, due to the substantially greater size of element 156. Thus, a signal generated by displacement plunger of target 138 and plunger 126 as tool 156 is rotated would not be useful for determining respective radii of individual teeth 156a. However, if measurement device 120 associated with plunger 126 and target 138 was to be used to measure a tool larger than tool 156, or to measure length of a single tool, it could be preferable to bring such tool into contact with the larger sized surface element 154b of target 138 rather than the smaller sized target element 154a.

It will be appreciated that a target attached to a plunger 126 could be triangular or of any of a number of other shapes besides a diamond shape, and yet provide a number of target surface elements of different sizes.

Figure 14:
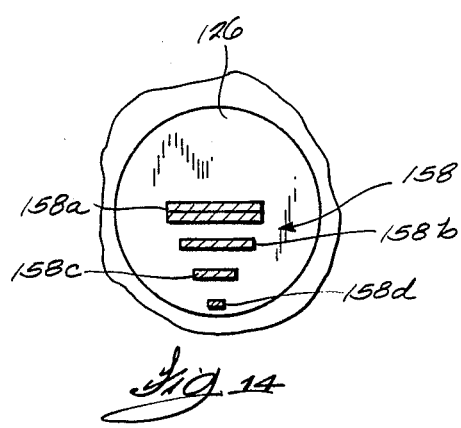
FIG. 14 shows a modified target joined to the end of the plunger shown in FIG. 6.

FIG. 14 shows a target 158 attached to plunger 126 comprising a number of target surface element 158a-d which are of varying sizes from one and other, and are not integral, or part of a continuous planar surface.

It will be appreciated that in order to automatically position a tool such as tool 156 to contact the desired target surface element of a target such as target 138, plunger 126 and target 138 must be in a specific angular position. As previously stated, the provision of a circular spacer 86 and a set screw 116 enables such specific positioning to be made.

I claim:

1. In a machine tool, apparatus for measuring a selected parameter of a cutting tool engaged by a tool engagement device which is selectively movable and locatable at a first reference position, said tool selectively moving relative to said first reference position in response to operation of said engagement device, said apparatus comprising:

a frame proximate to said first reference position;

means mounted on said frame for generating a measurement signal;

a plunger;

means for supporting said plunger for movement along a path of travel relative to said signal generating means, and for mounting said plunger to receive a force from said moving tool to position said plunger in spaced apart relationship with said signal generating means across a gap having a width representative of said selected tool parameter; and said signal generating means includes means for electrically coupling said plunger and said signal generating means across said gap to vary said measurement signal as a function of said gap width, so that said measurement signal varies as a function of said selected tool parameter.

2. The apparatus of claim 1 wherein:

said plunger comprises a body of conductive material; and said coupling means comprises means for inductively coupling said plunger and said signal generating means.

3. The apparatus of claim 1 wherein:

said plunger supporting means comprises means for supporting said plunger on said frame for movement along an axis toward and away from said signal generating means;

a biasing spring is positioned between said plunger and said frame for urging said plunger into spaced apart relationship with said signal generating means across a gap having a fixed known width in the absence of said force received by said plunger from said tool; and said engagement device is moved to bring said tool into contact with said plunger to move said plunger along said axis toward said signal generating means to diminish the width of said gap from said fixed known width to said width representing said tool parameter.

4. The apparatus of claim 3 wherein:

said signal generating means is mounted on said frame by means of a mounting block carrying said signal generating means and is supported by said frame; and means are coupled between said frame and said mounting block for maintaining said signal generating means at a fixed position relative to said first reference position during normal operation of said apparatus, and for allowing said signal generating means to be displaced from said fixed position in the event of over-travel of said tool.

5. The apparatus of claim 1 wherein:

said apparatus includes a processing means receiving said measurement signal from said signal generating means for detecting a level of said measurement signal corresponding to said gap width representing said tool parameter.

6. The apparatus of claim 5 wherein:

said processing means comprises means for sensing a minimum level of said measurement signal, said minimum level representing the difference between the actual and nominal values of a dimension of said cutting tool.

7. The apparatus of claim 1 wherein:

said tool engagement device comprises a rotary spindle which can be located at a second reference position as well as at said first reference position;

said plunger comprises a first plunger, and said apparatus includes a second plunger identical to said first plunger;

said signal generating means comprises a first signal generating means, and said apparatus includes a second signal generating means identical to said first signal generating means mounted on said frame at a specified location relative to said second reference position; and said plunger supporting means comprises means for mounting said first plunger for movement along a first axis in parallel relation with the spindle axis to vary the spacing between said first plunger and said first signal generating means, in response to movement of said tool along said first axis, and for mounting said second plunger for movement along a second axis in orthogonal relation with said first axis to vary the spacing between said second plunger and said second signal generating means in response to rotation of said tool by said tool engagement means when said engagement means is at said second reference position.

8. A method for measuring a selected parameter of a cutting tool engaged by a tool engagement device comprising the steps of:

mounting a device for generating a measurement signal at a specified position;

supporting a plunger for movement along a path of travel toward and away from said signal generating means;

selectively moving said engagement device proximate to said signal generating means;

coupling motion of said moving engagement device to said plunger through said tool to move said plunger into spaced apart relationship with said signal generating device across a gap having a width representing the value of said selected tool parameter; and electrically coupling said plunger and said signal generating device across said gap to vary said measurement signal as a function of said gap width and thereby as a function of said selected tool parameter.

9. The method of claim 8 wherein:

said method includes the step of distinguishing a particular level of said measurement signal corresponding to the gap width representative of said tool parameter from a plurality of signal levels.

10. The method of claim 8 wherein said cutting tool comprises a single point tool engaged by a rotary machine tool spindle, and wherein:

said motion coupling step comprises moving said tool into contact with said plunger as said spindle is moved to a reference position relative to said signal generating means to move said plunger along an axis into said spaced apart relationship with said signal generating means.

11. The method of claim 8 wherein said tool engagement device comprises a rotary spindle for a machine tool, said cutting tool comprises a multi-point tool having a plurality of teeth engaged by said spindle, and wherein:

said spindle is moved to a reference position relative to said signal generating means to orient the axis of the spindle in orthogonal relationship with an axis extending between the reference position and the signal generating means and lying along the path of travel of said plunger; and said motion coupling step comprises rotating said spindle when said spindle is at said reference position to successively bring each of said teeth of said tool into contact with said plunger to move said plunger along said axis by displacement amounts corresponding to the lengths of respective teeth.

* * * * *